United States Patent [19]
DiRisio

[11] Patent Number: 5,956,526
[45] Date of Patent: Sep. 21, 1999

[54] ONE-TIME-USE CAMERA WITH DEFLECTOR FOR PREVENTING ANTI-BACKUP PAWL FROM ENGAGING FILM WINDER DURING CAMERA ASSEMBLY

[75] Inventor: Anthony DiRisio, Rochester, N.Y.

[73] Assignee: Eastman Kodak Company, Rochester, N.Y.

[21] Appl. No.: 09/227,899

[22] Filed: Jan. 8, 1999

[51] Int. Cl.⁶ .................................................. G03B 17/24
[52] U.S. Cl. ............................................... 396/6; 396/396
[58] Field of Search ............................... 396/6, 395, 396, 396/411

[56] References Cited

U.S. PATENT DOCUMENTS

| | | | |
|---|---|---|---|
| 5,576,782 | 11/1996 | Kameyama | 396/6 |
| 5,669,016 | 9/1997 | Negishi et al. . | |
| 5,765,065 | 6/1998 | Yoshida et al. . | |

*Primary Examiner*—David M. Gray
*Attorney, Agent, or Firm*—Roger A. Fields

[57] ABSTRACT

A one-time-use camera which comprises a first part including a film winding thumbwheel rotatably supported for winding and unwinding rotation, and a second part assembled to the first part and including a resilient anti-backup pawl for engaging the thumbwheel to prevent unwinding rotation of the thumbwheel, is characterized in that the first part has a deflector arranged to deflect the anti-backup pawl to prevent the anti-backup pawl from engaging the thumbwheel during assembly of the first part to the second part and to allow the anti-backup pawl to engage the thumbwheel when the first part is assembled to the second part. Preferably, the deflector has an inclined portion that flexes the anti-backup pawl out of reach of the film winding thumbwheel to prevent engagement of the anti-backup pawl with the thumbwheel during assembly of the first part to the second part and an undercut that receives the anti-backup pawl to permit return of the anti-backup to within reach of the thumbwheel to allow the anti-backup pawl to engage the thumbwheel when the first part is assembled to the second part.

6 Claims, 10 Drawing Sheets

ONE-TIME-USE CAMERA WITH DEFLECTOR FOR PREVENTING ANTI-BACKUP PAWL FROM ENGAGING FILM WINDER DURING CAMERA ASSEMBLY

FIELD OF THE INVENTION

The invention relates generally to the field of photography, and in particular to one-time-use cameras. More specifically, the invention relates to a one-time-use camera with an anti-backup pawl for preventing reverse unwinding rotation of a film winding thumbwheel.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a film take-up chamber, an unexposed film roll prewound on a film spool in a film supply chamber from the film cartridge, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the film take-up chamber. Then, he removes the exposed filmstrip from the film cartridge to develop the negatives and make prints for the customer. At least some of the used camera parts may be recycled, i.e. reused, to remanufacture the camera.

Problem

A resilient anti-backup pawl for the film winding thumbwheel has a free pawl end that engages any one of the teeth of the thumbwheel to prevent reverse rotation of the thumbwheel in a film unwinding direction, when the shutter release button is manually depressed and the metering lever is pivoted out of engagement with the thumbwheel.

During manufacture of the one-time-use camera, the anti-backup pawl must be held disengaged from the film winding thumbwheel as the particular part which supports the anti-backup pawl is assembled to the separate part which supports the thumbwheel. This is done to prevent the pawl end from coming to rest against the tip of one of the teeth of the thumbwheel rather than between two adjacent teeth, i.e. to prevent the phenomenon known as "tooth topping".

SUMMARY OF THE INVENTION

According to one aspect of the invention, a one-time-use camera which comprises a first part including a film winding thumbwheel rotatably supported for winding and unwinding rotation, and a second part assembled to the first part and including a resilient anti-backup pawl for engaging the thumbwheel to prevent unwinding rotation of the thumbwheel, is characterized in that:

the first part has a deflector arranged to deflect the anti-backup pawl to prevent the anti-backup pawl from engaging the thumbwheel during assembly of the first part to the second part and to allow the anti-backup pawl to engage the thumbwheel when the first part is assembled to the second part. Preferably, the deflector has an inclined portion that flexes the anti-backup pawl out of reach of the film winding thumbwheel to prevent engagement of the anti-backup pawl with the thumbwheel during assembly of the first part to the second part and an undercut that receives the anti-backup pawl to permit return of the anti-backup to within reach of the thumbwheel to allow the anti-backup pawl to engage the thumbwheel when the first part is assembled to the second part.

According to another aspect of the invention, a method of assembling a first part of a one-time-use camera that includes a film winding thumbwheel rotatably supported for winding and unwinding rotation and a second part of the camera that includes a resilient anti-backup pawl for engaging the thumbwheel to prevent unwinding rotation of the thumbwheel comprises the steps:

moving at least one of the first and second parts towards the other to position them to be connected together, and simultaneously causing a deflector on the first part to momentarily deflect the anti-backup pawl on the second part out of reach of the thumbwheel to prevent the anti-backup pawl from engaging the thumbwheel as the first and second parts are positioned to be connected together; and connecting the first and second parts when the anti-backup pawl is within reach of the thumbwheel to allow the anti-backup pawl to engage the thumbwheel.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
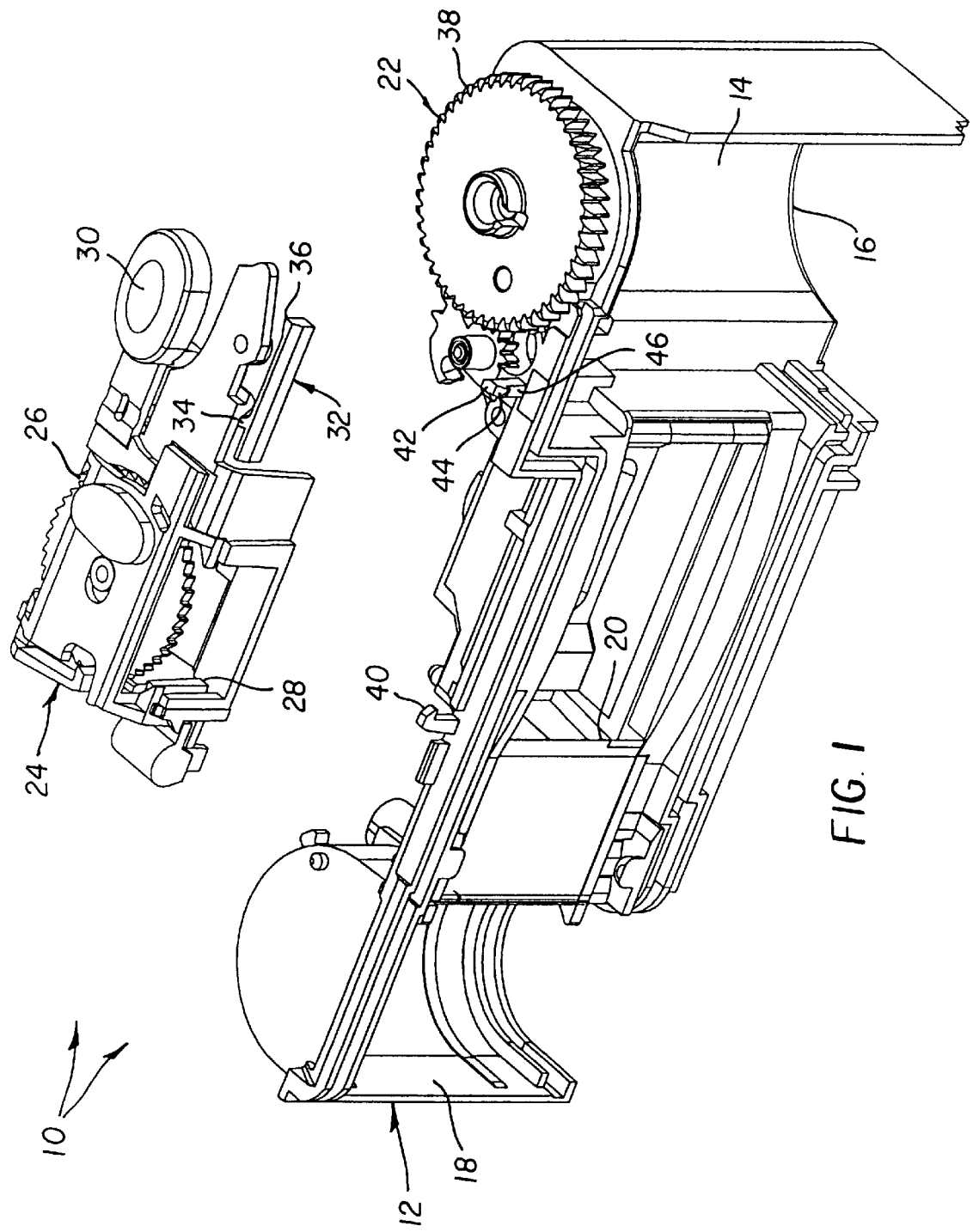
FIG. 1 is an exploded rear perspective view of a main body part and a top part of a one-time-use camera, consistent with a preferred embodiment of the invention.
Figure 2:
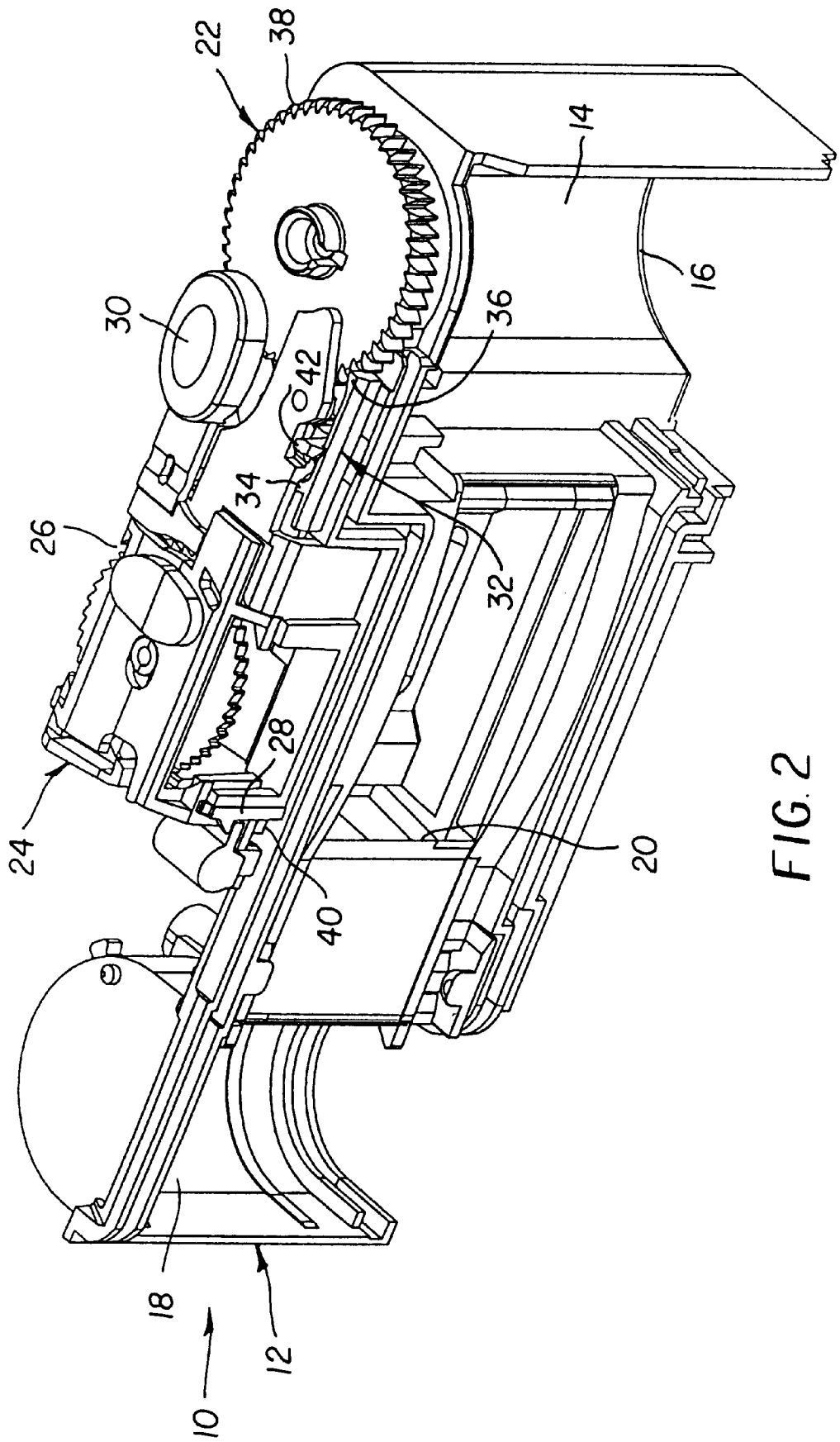
FIG. 2 is an assembled rear perspective view similar to FIG. 1.
Figure 3:
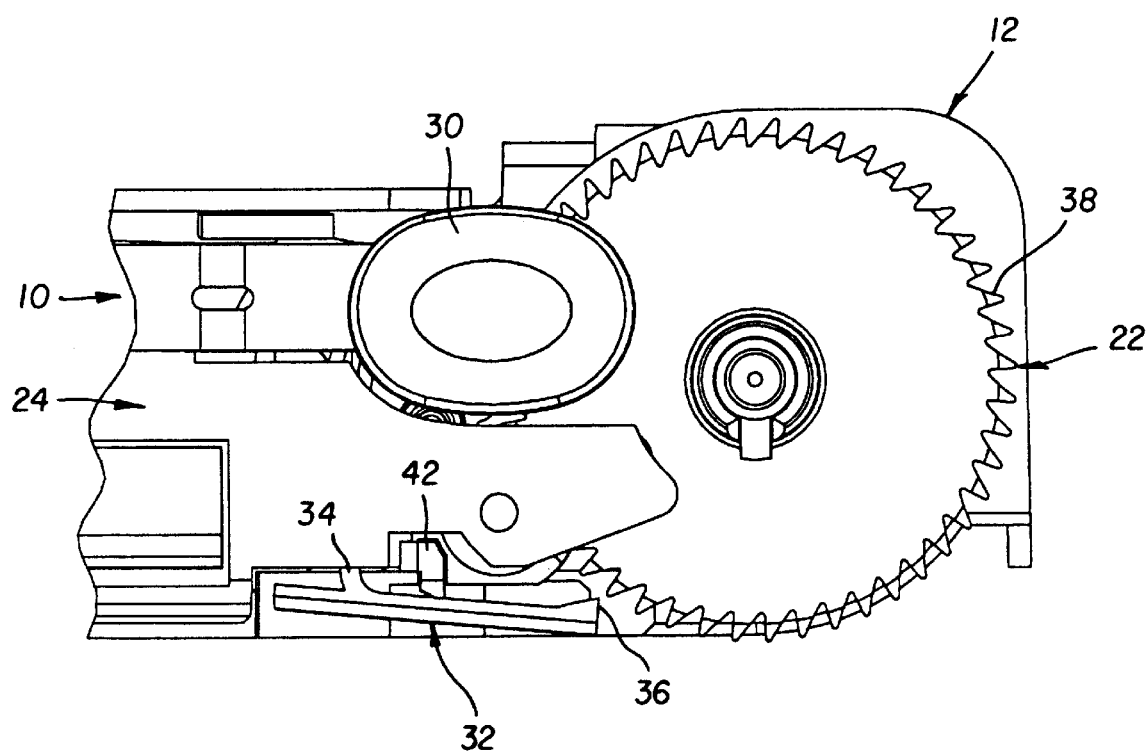
FIGS. 3 and 4 are top plan views of the main body part and the top part, depicting assembly of the top part to the main body part.
Figure 4:
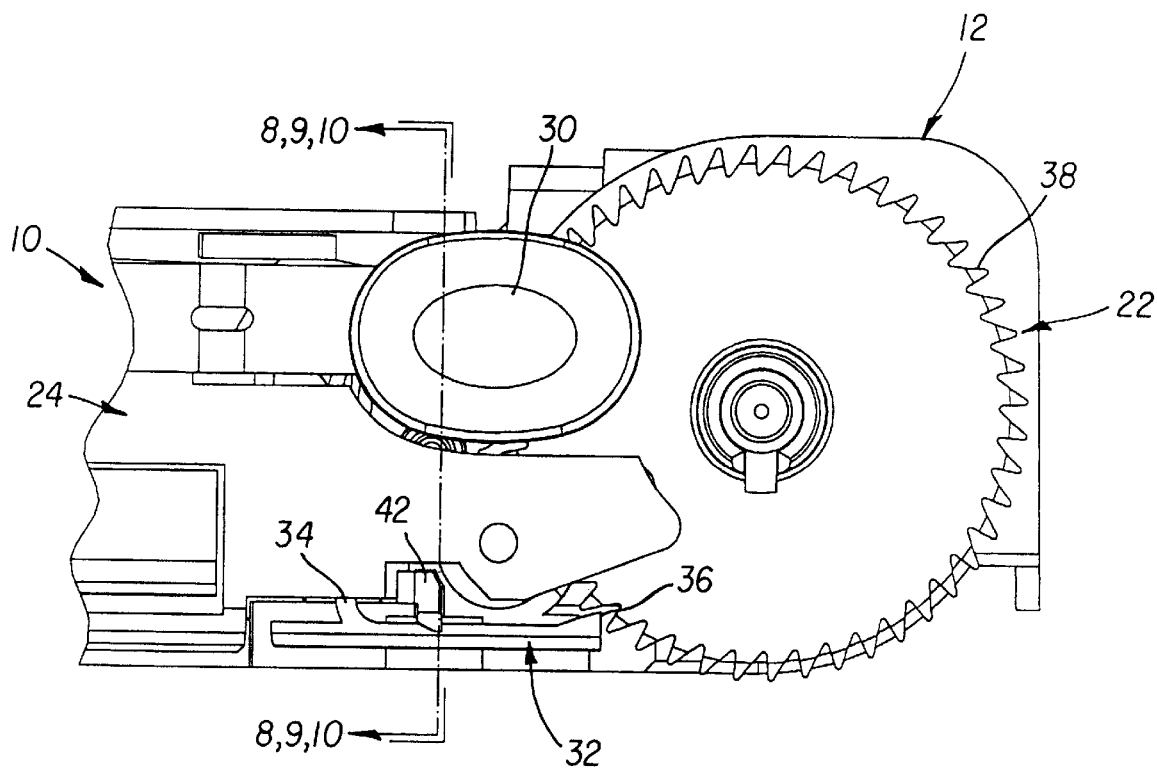
Figure 5:
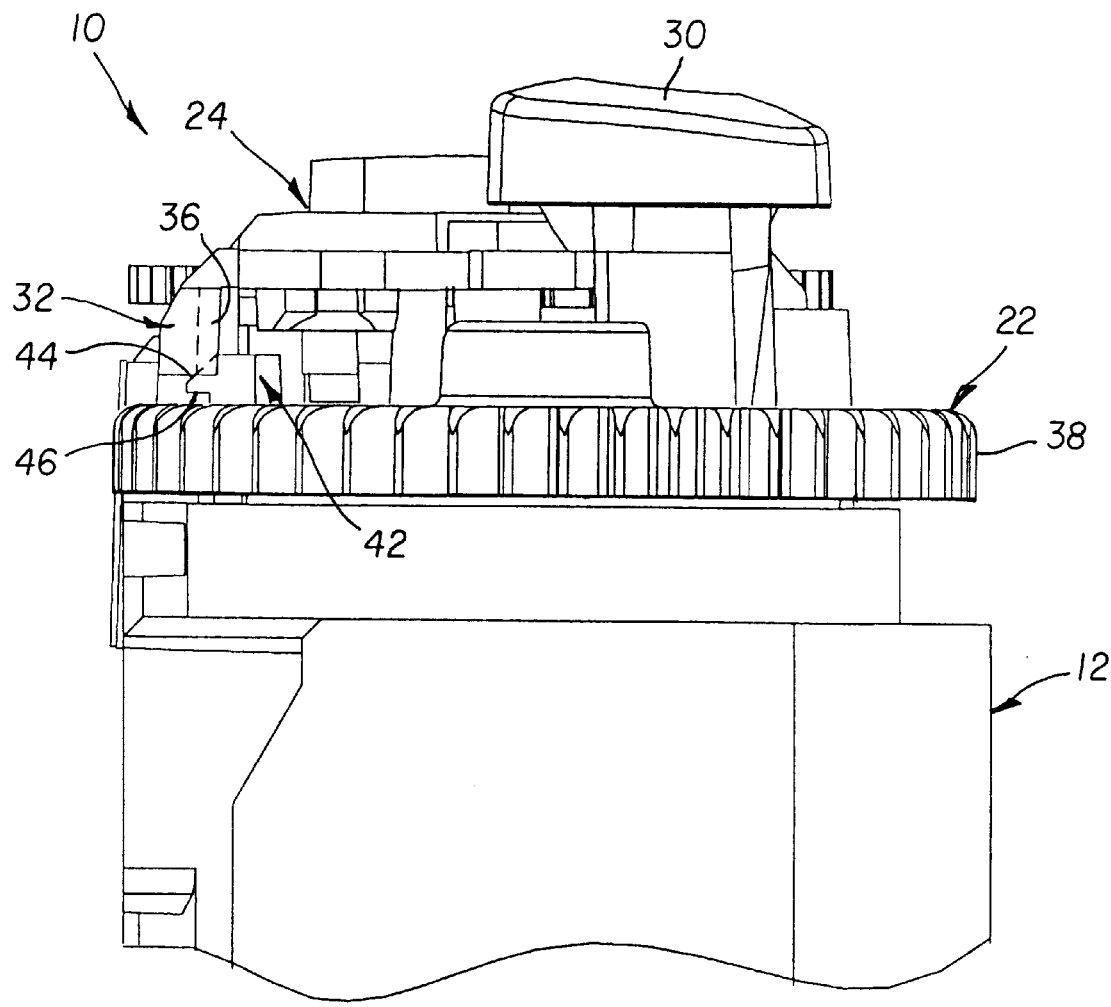
FIGS. 5, 6 and 7 are end elevation views of the main body part and the top part, depicting assembly of the top part to the main body part.
Figure 6:
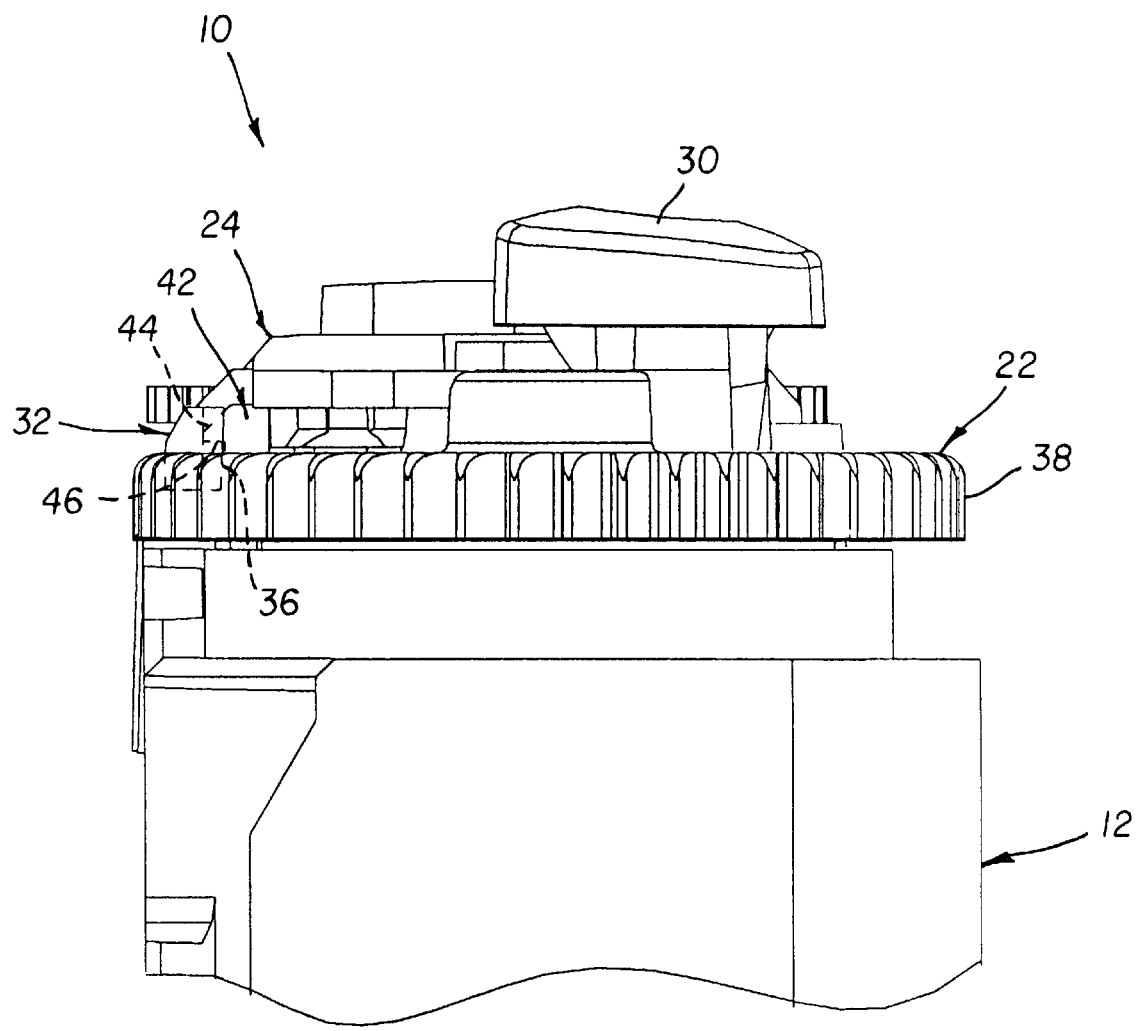
Figure 7:
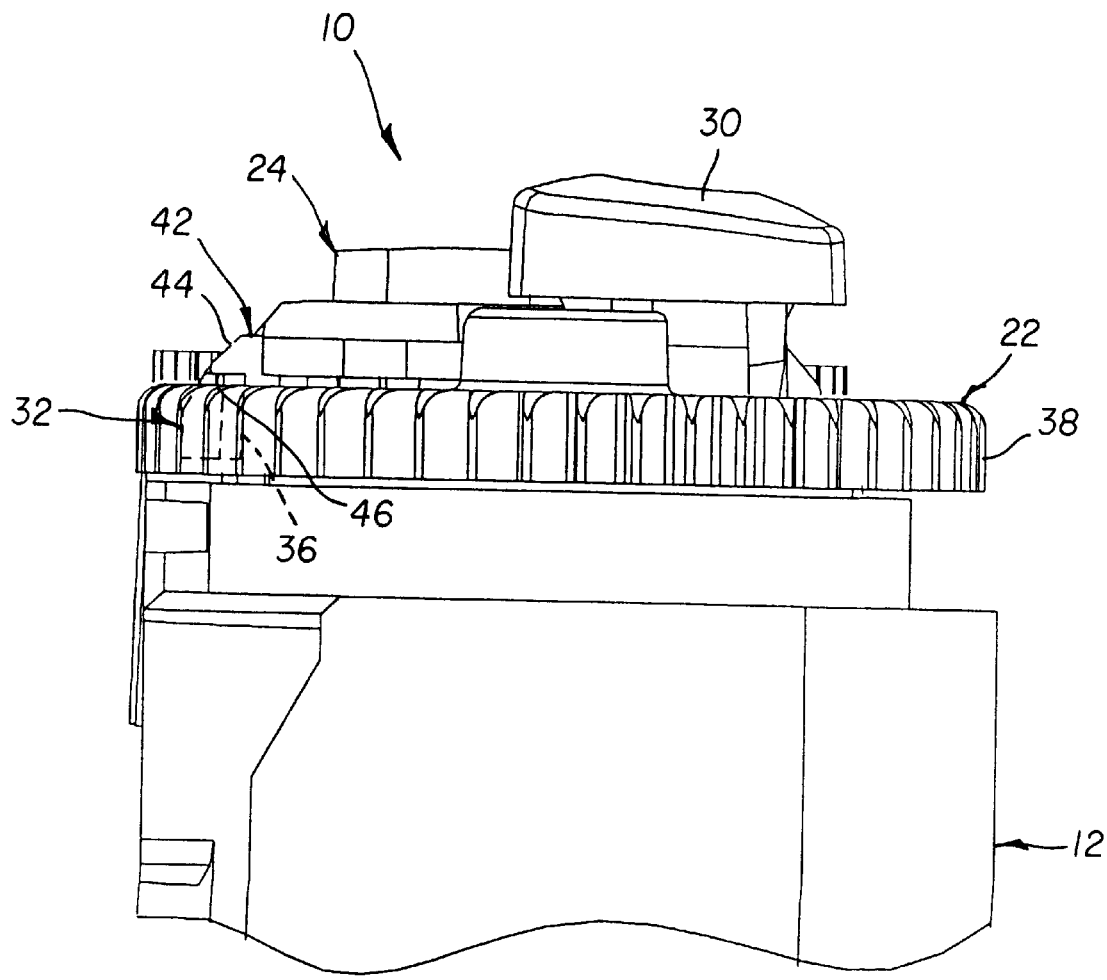
Figure 8:
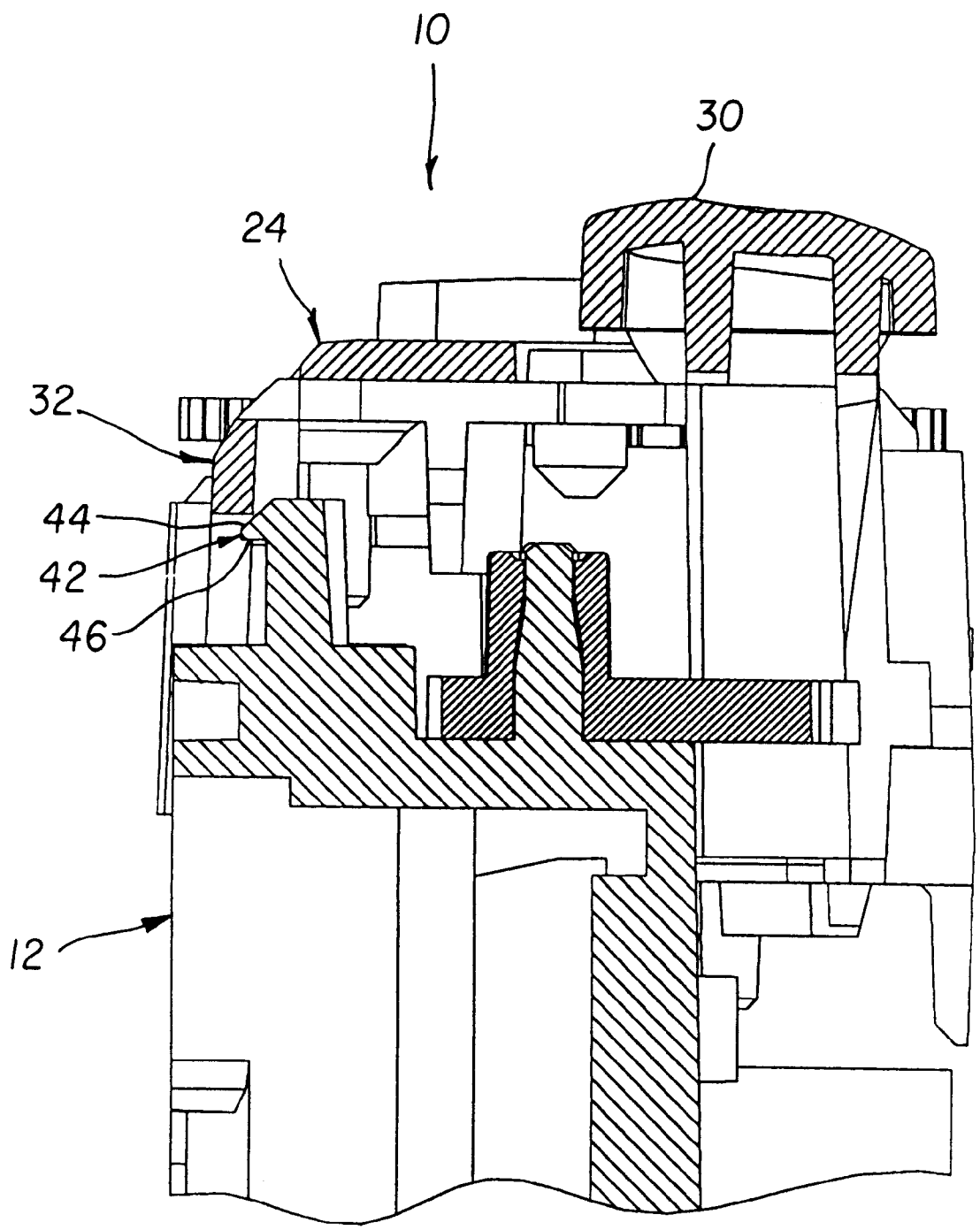
FIGS. 8, 9 and 10 are section elevation views as seen generally in the direction of the arrows in FIG. 4, depicting assembly of the top part to the main body part.
Figure 9:
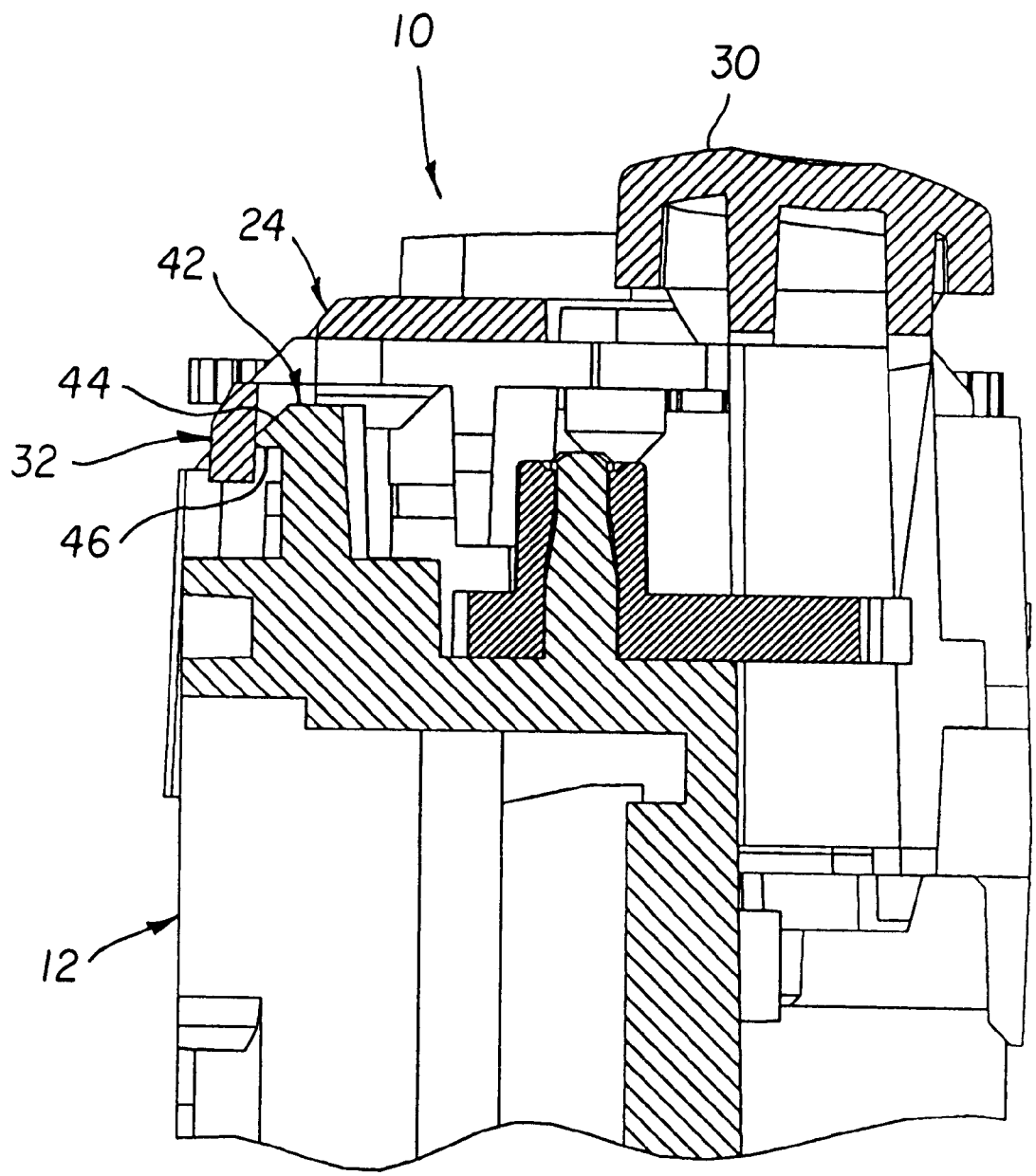
Figure 10:
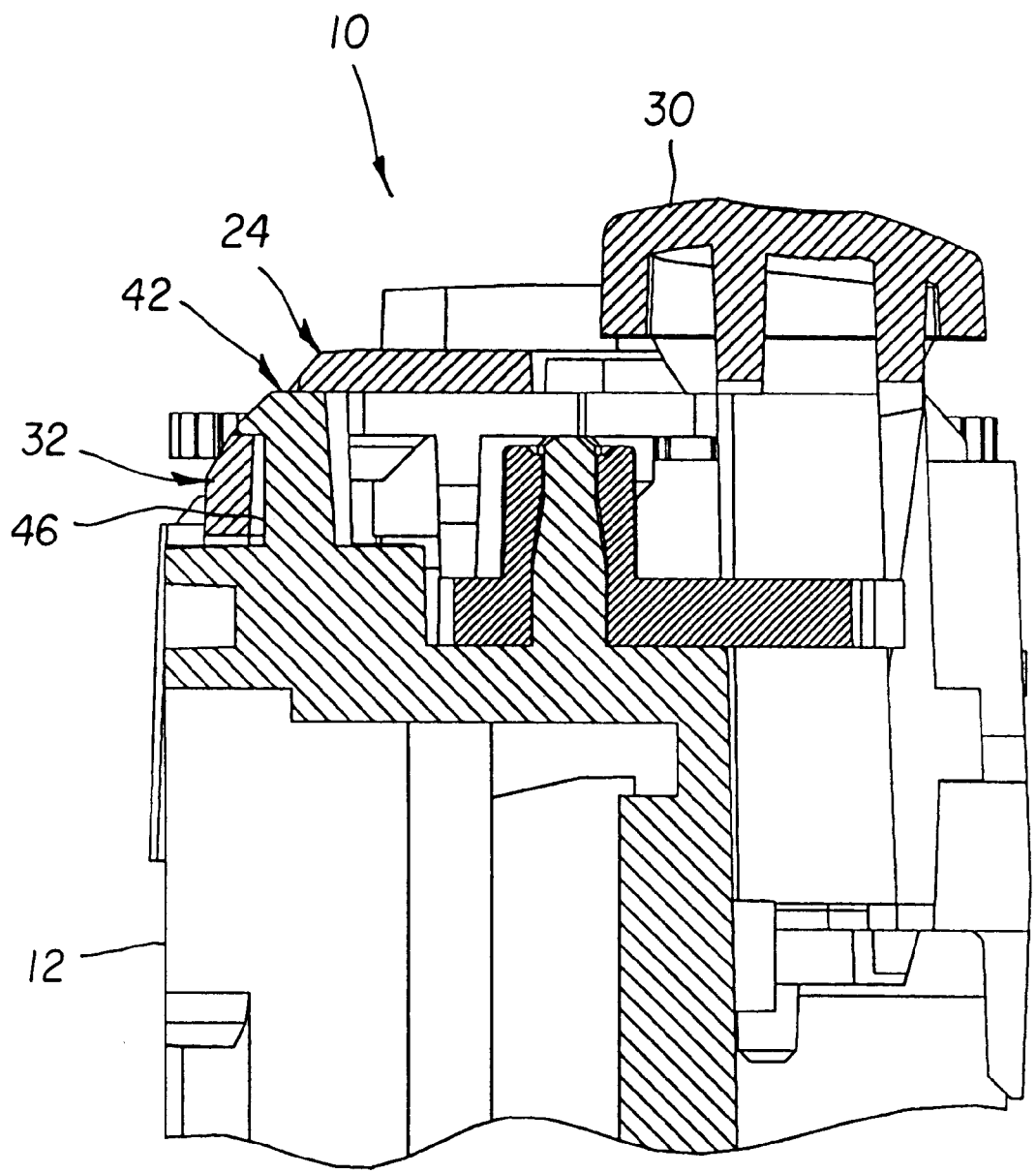

Referring now to the drawings, FIGS. 1–10 partially show a one-time-use camera 10 in which an opaque plastic main body part 12 is housed in a pair of opaque plastic front and rear cover parts (not shown). The front and rear cover parts are connected to one another and to the main body part 12 via known hook-in-hole connections (not shown).

The main body part 12 has a film take-up chamber 14 with a bottom loading opening 16 through which a known film cartridge (not shown) is inserted into the chamber, a film supply chamber 18 for an unexposed film roll (not shown), and a backframe opening 20 located between the film take-up chamber and the film supply chamber for exposing successive imaging sections of a filmstrip (not shown) which begin at the unexposed film roll and ends up inside the film cartridge. See FIGS. 1 and 2. An end cap or bottom lid (not shown) is releasably connected to the main body part 12 over the bottom loading opening 16 to close the film take-up chamber 18.

A film winding thumbwheel 22 is rotatably supported on the main body part 12 and has a depending coaxial stem (not shown) received in an end opening of a film spool in the film cartridge to rotationally engage the film spool. Manual winding rotation of the thumbwheel 22 (counter-clockwise in FIGS. 1, 2 and 4) similarly rotates the film spool in the film cartridge to wind each exposed section of the filmstrip into the film cartridge.

A top part 24 has a pair of front and rear viewfinder openings 26 and 28 and a shutter release button 30 and anti-backup pawl 32. The anti-backup pawl 32 is resiliently supported on the top part 24 at an integral protuberance 34 that interconnects the anti-backup pawl and the top part. A free pawl end 36 the anti-backup pawl 32 is intended to engage individual peripheral teeth 38 arranged in a circular array on the film winding thumbwheel 22. The pawl end 36 engages any one of the teeth 38 to prevent unwinding rotation of the thumbwheel 22 (clockwise in FIGS. 1, 2 and 4).

The top part 24 is configured to be assembled to the main body part 12 as shown in FIGS. 1–10. An upstanding hook 40 on the main body part 12 is received in a hole (not shown) in the top part 24 to connect the top part to the main body part.

An upstanding deflector or ramp 42 on the main body part 12, proximate the film winding thumbwheel 22, has an inclined portion 44 that flexes the pawl end 36 of the anti-backup pawl 32 out of reach of the teeth 38 of the thumbwheel 22 to prevent engagement of the pawl end with any one of the teeth during assembly of the top part 24 to the main body part 12. See FIGS. 5-10. An undercut 46 in the deflector 42, located beneath the inclined portion 44, receives the anti-backup pawl 32 to permit return of the anti-backup to within reach of the teeth 38 of the thumbwheel 22 to allow the anti-backup pawl to engage the thumbwheel when the top part is assembled to the main body part 12.

A method of assembling the top part 24 to the main body part 12 comprises the steps:

(1) moving the top part 24 towards the main body part 12 to position them to be connected together via the hook 40 on the main body part and the hole in the top part;

(2) simultaneously with step (1), first moving the anti-backup pawl 32 along the inclined portion 44 of the deflector 42 on the main body part 12 to cause the inclined portion to momentarily deflect the pawl end 36 of the antibackup pawl out of reach of the teeth 38 of the thumbwheel 32 to prevent the antibackup pawl from engaging the thumbwheel as the top part and the main body part are positioned to be connected together, and then moving the anti-backup pawl from the inclined portion to the under cut 46 to permit the anti-backup pawl to snap backwards into the undercut to allow return of the pawl end to within reach of any one of the teeth of the film winding thumbwheel; and (3) connecting the top part 24 and the main body part 12 via the hook 40 on the main body part and the hole in the top part when the pawl end 36 is within reach of any one of the teeth 38 to allow the anti-backup pawl to engage the thumbwheel.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. film take-up chamber
16. bottom loading opening
18. film supply chamber
20. backframe opening
22. film winding thumbwheel
24. top part
26. front viewfinder opening
28. rear viewfinder opening
30. shutter release button
32. anti-backup pawl
34. protuberance
36. pawl end
38. teeth
40. hook
42. deflector
44. inclined portion
46. undercut

What is claimed is:

1. A one-time-use camera which comprises a first part including a film winding thumbwheel rotatably supported for winding and unwinding rotation, and a second part assembled to said first part and including a resilient anti-backup pawl for engaging said thumbwheel to prevent unwinding rotation of said thumbwheel, is characterized in that:

said first part has a deflector arranged to deflect said anti-backup pawl to prevent said anti-backup pawl from engaging said thumbwheel during assembly of said first part to said second part and to allow said anti-backup pawl to engage said thumbwheel when said first part is assembled to said second part.

2. A one-time-use camera as recited in claim 1, wherein said first part that includes said film winding thumbwheel is a main body part having a film take-up chamber, and said second part that includes said anti-backup pawl has a viewfinder opening.

3. A one-time-use camera as recited in claim 1, wherein said deflector has an inclined portion that flexes said antibackup pawl out of reach of said film winding thumbwheel to prevent engagement of said anti-backup pawl with said thumbwheel during assembly of said first part to said second part and an undercut that receives said anti-backup pawl to permit return of said anti-backup to within reach of said thumbwheel to allow said anti-backup pawl to engage said thumbwheel when said first part is assembled to said second part.

4. A method of assembling a first part of a one-time-use camera that includes a film winding thumbwheel rotatably supported for winding and unwinding rotation and a second part of the camera that includes a resilient anti-backup pawl for engaging the thumbwheel to prevent unwinding rotation of the thumbwheel, said method comprising:

moving at least one of the first and second parts towards the other to position them to be connected together, and simultaneously causing a deflector on the first part to momentarily deflect the anti-backup pawl on the second part out of reach of the thumbwheel to prevent the anti-backup pawl from engaging the thumbwheel as the first and second parts are positioned to be connected together; and connecting the first and second parts when the anti-backup pawl is within reach of the thumbwheel to allow the anti-backup pawl to engage the thumbwheel.

5. A method as recited in claim 4, wherein the anti-backup pawl is moved along an inclined portion of the deflector to be flexed out of reach of the film winding thumbwheel.

6. A method as recited in claim 5, wherein the anti-backup pawl is moved from the inclined portion of the deflector to an undercut of the deflector to be received in the undercut to allow return of the anti-backup pawl to within reach of the film winding thumbwheel.

* * * * *